April 24, 1934.   M. LOUGHEAD   1,956,039
BRAKE MECHANISM
Filed Aug. 18, 1928
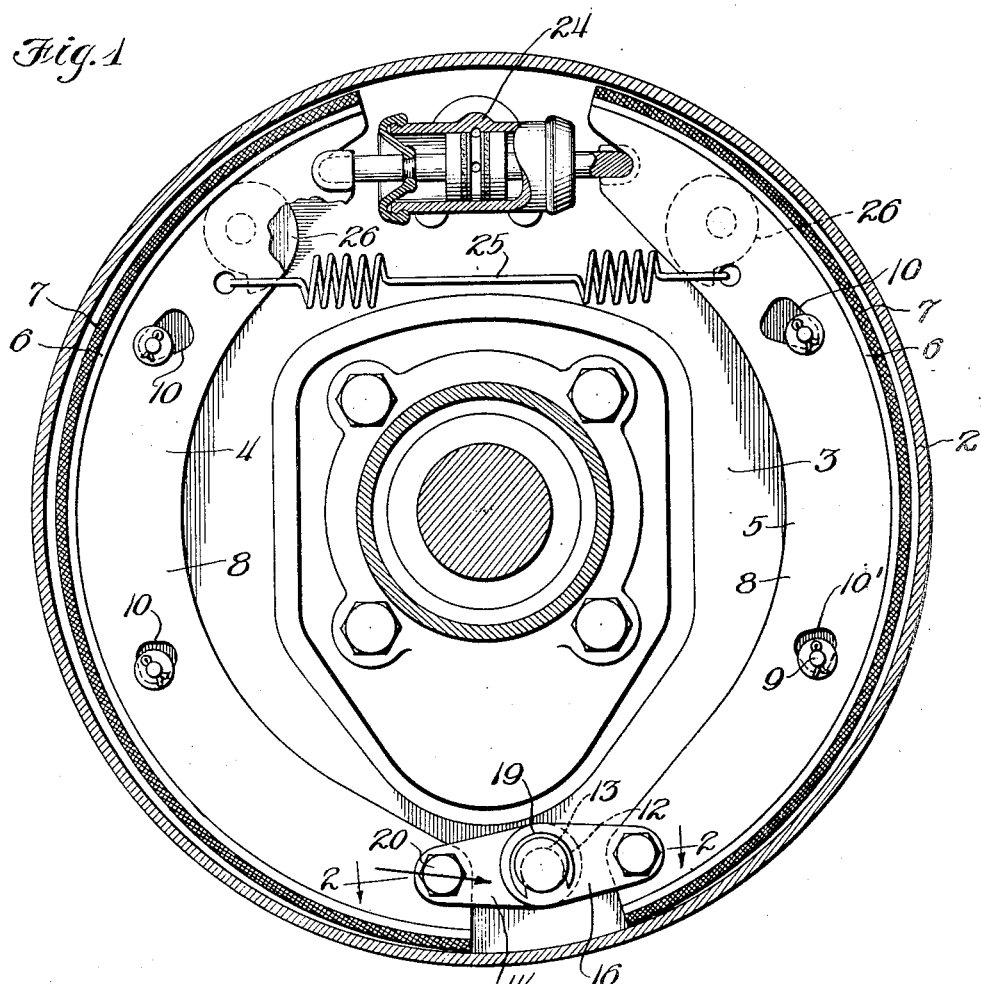
Inventor:
Malcolm Loughead
By Williams, Bradbury, McCaleb + Hinkle
Attys.

Patented Apr. 24, 1934

1,956,039

UNITED STATES PATENT OFFICE 1,956,039

BRAKE MECHANISM

Malcolm Loughead, Detroit, Mich., assignor to Hydraulic Brake Company, Los Angeles, Calif., a corporation of California Application August 18, 1928, Serial No. 300,421.

7 Claims. (Cl. 188—79.5)

My invention relates to brake mechanism.

It is particularly applicable for maintaining a proper adjustment between the frictional surfaces of the brake, i. e., between the brake drum and shoes, and will be illustrated and described as embodied in a brake of the internal type, although not limited to brakes of this type.

An object of the invention is to provide a simple and effective mechanism for maintaining the frictional surfaces in proper contacting relationship during the braking operation.

Another object is to provide mechanism which will adjust the brake shoes in accordance with the wear of the frictional surfaces.

Another object is to provide a brake mechanism which is self adjusting.

A further object is to provide mechanism by which an equal pressure may be exerted over the entire peripheral area of the brake shoe after the shoe has become worn.

Other objects and advantages will hereinafter appear.

An embodiment of the invention is illustrated in the accompanying drawing wherein:

Fig. 1 is an elevation, partly in section, of a brake mechanism embodying the invention; and Fig. 2 is a horizontal section taken on the line 2—2 of Fig. 1.

In the embodiment chosen for illustration the brake is of the internal type, in which a drum 2 attached to a wheel or other rotatable member (not shown) encloses the shoes and operating mechanism which are supported on a pan 3. A pair of brake shoes 4 and 5 are shown mounted in close spatial relationship to the drum 2. Each shoe has an arcuate segment 6 covered by a brake lining 7, and an inwardly extending flange 8.

A plurality of guide pins 9, which are attached to pan 3, project through apertures 10 of flanges 8. Mounted on the lower portion of pan 3 is an anchor pin 11, having an enlargement 12 and an eccentric threaded stud 13, by means of which it is attached to pan 3.

Anchor pin 11 is provided with a reduced portion upon which a plurality of links 14, 15, 16 and 17 are pivotally mounted, links 14 and 16 being separated from links 15 and 17 by a spacer 18. The links and spacer are retained in position by a horse shoe shaped retaining clip 19 that fits in a groove in pin 11. Links 14 and 15 are provided with aligned apertures, and flange 8 of shoe 4 is provided with a similar aperture, permitting the links to be attached to the flange by the insertion of a pin or bolt 20. Associated with bolt 20 is a lock washer 21 which causes a frictional engagement of links 14 and 15 with flange 8 when a nut 22 is drawn tightly on its bolt 20. Brake shoe 5 is similarly connected to links 16 and 17, except that a pair of spacers 23 are placed between flange 8 and the links for the purpose of relieving the pressure of these links upon links 14 and 15, thereby reducing the friction at anchor pin 11.

The brake shoes are actuated by means of a fluid motor 24 which serves to force the brake shoes into engagement with the drum. The shoes are withdrawn from the drum by means of a spring 25 against stops 26. The frictional engagement between the links and the flanges of the brake shoes is so great that there will not normally be any pivoting action at these points and the shoes will, therefore pivot about the anchor pin when moved to and from engagement with the drum.

As a brake shoe is moved about its anchor pin into and out of engagement with the drum, the distance through which any part of the shoe travels depends upon its distance from the anchor pin,—the greater the distance from the pin the larger the movement. The upper part or toe of the shoe, therefore, will travel farther than the lower part or heel of the shoe when the shoe is applied to the drum. On account of this difference in the amount of movement between the toe and heel of a shoe, the additional movement which is required to compensate for wear at the toe is not sufficient to compensate for the wear at the heel, since the heel, although moving through the same angle, will not move as far as the toe where the shoe is pivoted only with respect to its anchor pin, as has been the practice heretofore. However, by providing an additional pivot for the brake shoe the lower portion or heel of the brake shoe can be made to approach nearer the drum when the braking force is applied and thus compensate for the wear of the heel.

The operation of the link mechanism is as follows. A force exerted by fluid motor 24 upon the toe of the shoe will result in a force in the opposite direction at the heel of the shoe which is perpendicular to a radius of the drum. Considering the force indicated by the arrow at the pin 20, the anchor pin is located in such a position that the direction of force at pin 20 will pass below the center of the anchor pin. This results in a constant tendency for the angle between the link mechanism and the shoe to become more acute when the shoe is applied to the drum. This tendency, however, is counteracted by the engagement of the shoe with the drum, allowing only so much pivoting at pin 20 to take place as is sufficient to compensate for wear at the heel or lower portion of the shoe and permit the heel properly to engage the drum.

In practice the anchor pin is mounted at a lesser distance from the center of the drum than the pivotal connection between the links and the brake shoe, thereby increasing the acuteness of the angle between these parts and consequently increasing the tendency for the connection to pivot as the brake shoe is worn.

The eccentric mounting of the anchor pin 12 permits the adjustment of its radial distance from the center of the drum, so that if the angle between the links and a brake shoe becomes too small and the tendency to pivot too great, the angle may be adjusted by increasing the distance of the anchor pin from the center of the drum.

I claim:

1. A brake mechanism comprising a brake shoe, a pivotally mounted link, a pivotal connection between one end of the shoe and the link, and means for rendering said pivotal connection rigid under ordinary pivoting force.

2. A brake mechanism comprising a brake shoe, a link, a pivotal mounting for the link, a pivotal connection between the link and one end of the brake shoe, and means for introducing a high frictional resistance in the pivotal connection between the link and the brake shoe.

3. In combination with a brake drum, a brake shoe, an anchor pin in fixed relation to the drum, a link pivotally mounted on the anchor pin, a pin forming a pivotal connection between one end of the brake shoe and the link, and a lock nut associated with the said last mentioned pin to introduce friction into the pivotal connection between the brake shoe and the link.

4. In combination with a brake drum, a brake shoe, a link connected to one end of the brake shoe frictionally maintained at an angle to the brake shoe determined by the wear of the brake shoe, and means for varying the angle between the brake shoe and the link.

5. In combination with a brake drum, a brake shoe, a link connected to the brake shoe frictionally maintained at an angle to the brake shoe determined by wear of the brake shoe, and an eccentrically mounted anchor pin carrying the opposite end of the link and adjustable to vary the angle between the brake shoe and the link.

6. A brake mechanism of the class described, comprising a rotatable member, a non-rotatable member adapted to be brought into braking engagement with said rotatable member, a support for said non-rotatable member, brake applying means associated with one end of said non-rotatable member for causing engagement of said members, and an adjustable connection between said support and the other end of said non-rotatable member automatically actuated by said last-named member to compensate for wear of said members, said connection receiving the thrust resulting from a braking engagement between said members.

7. A brake mechanism comprising a pan, a pin carried by said pan, brake shoes, links pivoted about said pin, pivotal connections between said links and said shoes, means for introducing high frictional resistance in said pivotal connections, a brake drum, means for forcing said shoes against said drum, retractile means for said shoes, stop means engaging said brake shoe for limiting the retractile movement thereof, and shoe guiding means carried by said pan and permitting automatic adjustment of the pivotal connections between said links and said shoes.

MALCOLM LOUGHEAD.